(12) United States Patent
Myers et al.

(10) Patent No.: US 8,296,925 B2
(45) Date of Patent: Oct. 30, 2012

(54) BATTERY ASSEMBLY FOR USE IN AN ELECTRONIC DEVICE

(75) Inventors: Scott Myers, San Francisco, CA (US); Erik Wang, Redwood City, CA (US); Trent Weber, Saratoga, CA (US); Jason Sloey, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/964,434

(22) Filed: Dec. 9, 2010

(65) Prior Publication Data

US 2011/0072639 A1    Mar. 31, 2011

Related U.S. Application Data

(62) Division of application No. 12/112,764, filed on Apr. 30, 2008, now Pat. No. 7,871,720.

(51) Int. Cl.
*H01M 2/00* (2006.01)
*H01M 2/10* (2006.01)
*H01M 2/20* (2006.01)
*H01M 6/48* (2006.01)
*B23P 17/04* (2006.01)

(52) U.S. Cl. ......... 29/592.1; 429/96; 429/123; 429/162; 429/163; 429/178

(58) Field of Classification Search ............... 429/162, 429/156, 99, 163, 123, 178, 96; 29/592.1, 29/623.1; 361/683; 349/45; 257/723; 439/500, 439/218; 438/106

See application file for complete search history.

(56) References Cited

U.S. PATENT DOCUMENTS

| | | | |
|---|---|---|---|
| 5,096,788 A | 3/1992 | Bresin et al. | |
| 5,654,111 A | 8/1997 | Minomiya et al. | |
| 6,287,140 B1 * | 9/2001 | Itoh | 439/500 |
| 6,411,503 B1 | 6/2002 | Kambayashi et al. | |
| 6,731,353 B1 * | 5/2004 | Credelle et al. | 349/45 |
| 2002/0027769 A1 | 3/2002 | Kasahara et al. | |
| 2003/0207603 A1 | 11/2003 | Potega | |
| 2004/0127952 A1 | 7/2004 | O'Phelan et al. | |
| 2005/0038325 A1 | 2/2005 | Moll | |
| 2005/0042936 A1 | 2/2005 | Perry | |

FOREIGN PATENT DOCUMENTS

JP    63019774 A    1/1988

OTHER PUBLICATIONS

"Replace the Battery in your Game Cartridge", The Pokemon Masters Forum, Jan. 30, 2007. Retrieved online on Jan. 28, 2011 from http://www.pokemasters.net/forum/showthread.php?t=15464.*

* cited by examiner

*Primary Examiner* — Jonathan Crepeau
*Assistant Examiner* — Kenneth Douyette
(74) *Attorney, Agent, or Firm* — Dorsey & Whitney LLP

(57) ABSTRACT

A battery assembly for use in an electronic device is provided. The battery assembly may include a battery cell (e.g., a rechargeable battery cell), a battery connector for providing power from the battery cell to the electronic device, and a flex circuit electrically coupling the battery cell to the electronic device. The battery connector may be located adjacent the battery cell, and may include one or more alignment mechanisms for ensuring that conductive pads of the battery connector align properly with corresponding conductive elements of the electronic device. The battery cell may be fixed to the electronic device using an adhesive layer (e.g., double sided tape) placed between the cell and the electronic device. A tab may extend beyond the periphery of the battery cell to allow a user to pull or peal the battery cell from the electronic device for replacement or repair. In some embodiments, a tool may be used to grasp the tab.

17 Claims, 3 Drawing Sheets

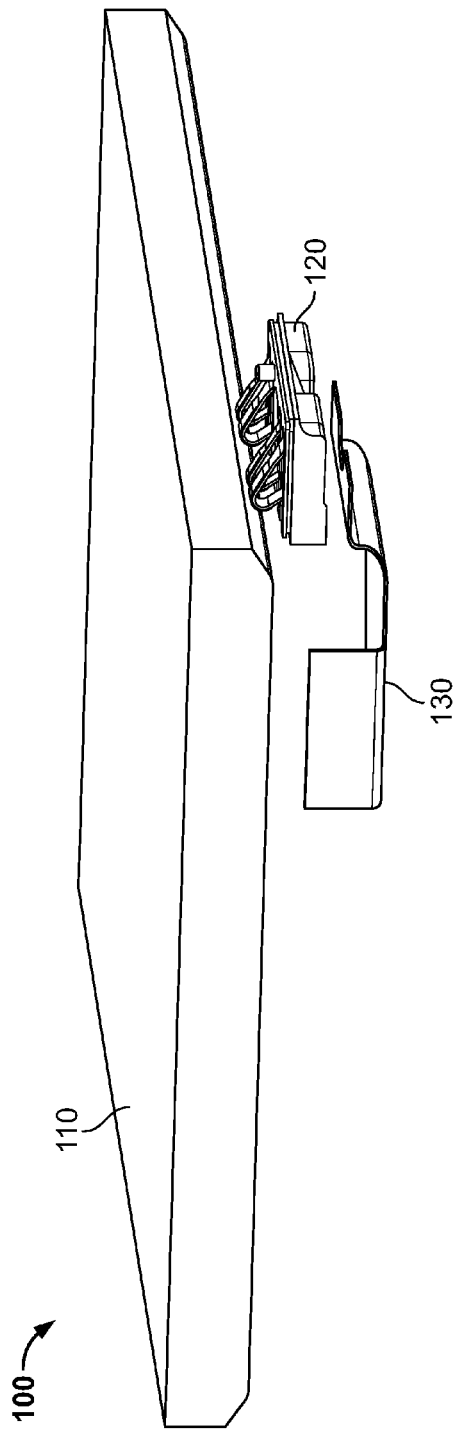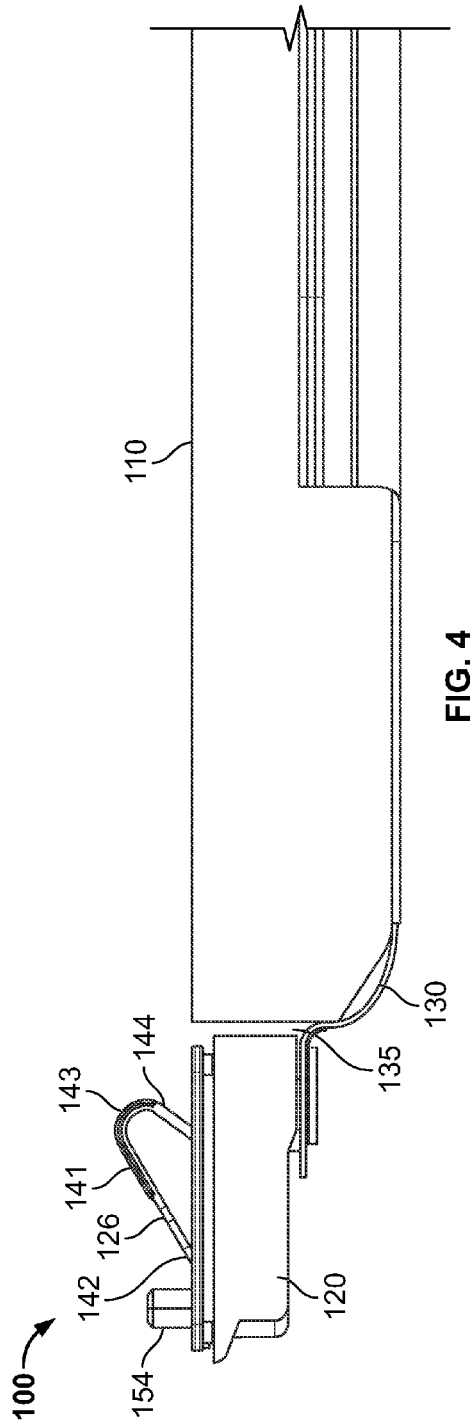

BATTERY ASSEMBLY FOR USE IN AN ELECTRONIC DEVICE

CROSS-REFERENCE TO RELATED APPLICATION

This application is a divisional of commonly-assigned U.S. patent application No. 12/112,764, filed Apr. 30, 2008, now U.S. Pat. No. 7,871,720, which is fully incorporated by reference herein in its entirety.

BACKGROUND OF THE INVENTION

This invention is directed to a removable battery assembly for use in an electronic device.

To perform as designed, electronic devices require power. Power may be supplied using many different approaches, including for example by coupling the electronic device to an external power supply (e.g., plugging a computer in an electrical socket), or by including a battery or capacitor in the electronic device. To lengthen the use of electronic devices powered by batteries, the batteries may be made rechargeable (e.g., using an external power supply), or replaceable (e.g., by providing access to a battery bay within the electronic device). In some electronic devices, only a technician may be able to replace batteries, while in other electronic devices the batteries may be replaceable by the user of the device.

Batteries may be coupled to the electronic device using different approaches. For example, a battery may be inserted in a bay of the electronic device case, and held in place using springs, foam, protrusions (e.g., in a cover placed over the bay), or any other suitable approach. In some embodiments, the battery may be retained using a press fit-type approach.

Different approaches may be used to provide power from the battery to electronic device components. For example, some battery cells include conductive tabs on the surface of the cell itself that are placed in contact with corresponding conductive tabs of the electronic device to provide power. Other battery cells may include wires or circuitry for coupling the battery to the electronic device. Although such approaches may be suitable for certain electronic devices, some smaller portable electronic devices, such as for example cellular telephones, portable media players, and PDAs may require a different battery system.

SUMMARY OF THE INVENTION

A battery assembly for use in an electronic device is provided.

The battery assembly may include a battery cell, a battery connector, and a flex circuit for electrically coupling the battery cell to the battery connector. The battery cell may substantially be in the form of a box. In some embodiments, the battery cell may include different shapes, for example to account for the shape of the electronic device in which the battery cell is placed.

The battery cell may provide power to the electronic device via the intermediary of the battery connector. The battery connector may be located at any suitable position relative the battery cell, including for example adjacent a side wall of the cell, between the top and bottom surfaces of the cell. The battery connector may include one or more conductive pads for transferring power. In some embodiments, the battery connector may include one or more pads for sensing the temperature of the electronic device.

A flex circuit may be used to electrically couple the battery cell to the battery connector. For example, the flex circuit may be placed over a conductive portion of the battery cell, and may also be placed over a conductive portion of the battery connector. The size of the flex circuit may be selected to ensure that enough power is available to be transferred from the battery cell to power the electronic device, and to quickly recharge the battery cell when necessary. In some embodiments, portions of the flex circuit may be attached to one or both of the battery cell and connector using an adhesive (e.g., to provide a structurally secure connection).

The battery assembly may be secured to the electronic device using any suitable approach. In some embodiments, the battery connector may include an aperture through which a mechanical fastener (e.g., a screw) may pass and engage the electronic device, thus securing the battery connector between the mechanical fastener and the electronic device. To ensure that the battery connector is properly aligned (e.g., and that the conductive pads are in contact with their counterparts in the electronic device), the battery connector may include a post operative to extend into an indentation of the electronic device (e.g. providing fine alignment. To release the battery assembly, the mechanical fastener may simply be removed.

The battery cell may be coupled to the electronic device using any suitable approach. In some embodiments, an adhesive layer attached to a surface of the battery cell may bind to the electronic device. For example, a layer of double sided tape may be placed on the battery cell, and pressed against the electronic device. To release the battery cell, a tab extending from the periphery of the battery cell may be pulled, cause the adhesive layer to detach from the electronic device (e.g., pull the tab to peal off the adhesive layer). In some embodiments, a special tool may be used, for example a tool operative to engage a feature (e.g., a hole) in the tab.

BRIEF DESCRIPTION OF THE DRAWINGS

The above and other features of the present invention, its nature and various advantages will be more apparent upon consideration of the following detailed description, taken in conjunction with the accompanying drawings in which:

FIG. 3 is an exploded view of the battery assembly of FIG. 1 in accordance with one embodiment of the invention;

FIG. 4 is a side view of the battery connector of the battery assembly of FIG. 1 in accordance with one embodiment of the invention;

DETAILED DESCRIPTION

Figure 1:
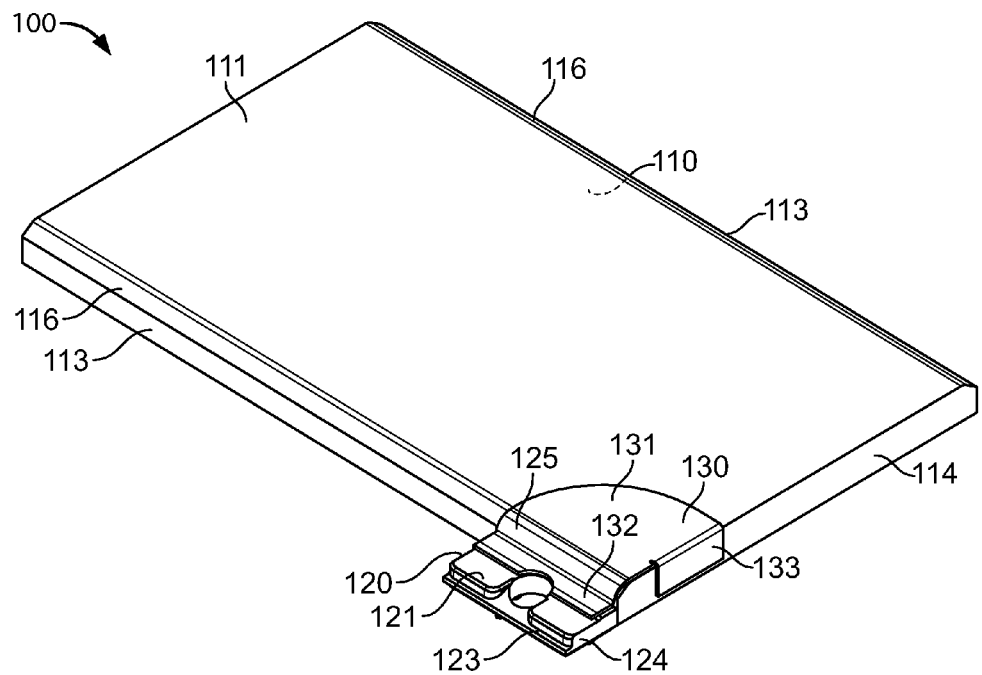
FIG. 1 is a top perspective view of an illustrative battery assembly for an electronic device in accordance with one embodiment of the invention.
Figure 2:
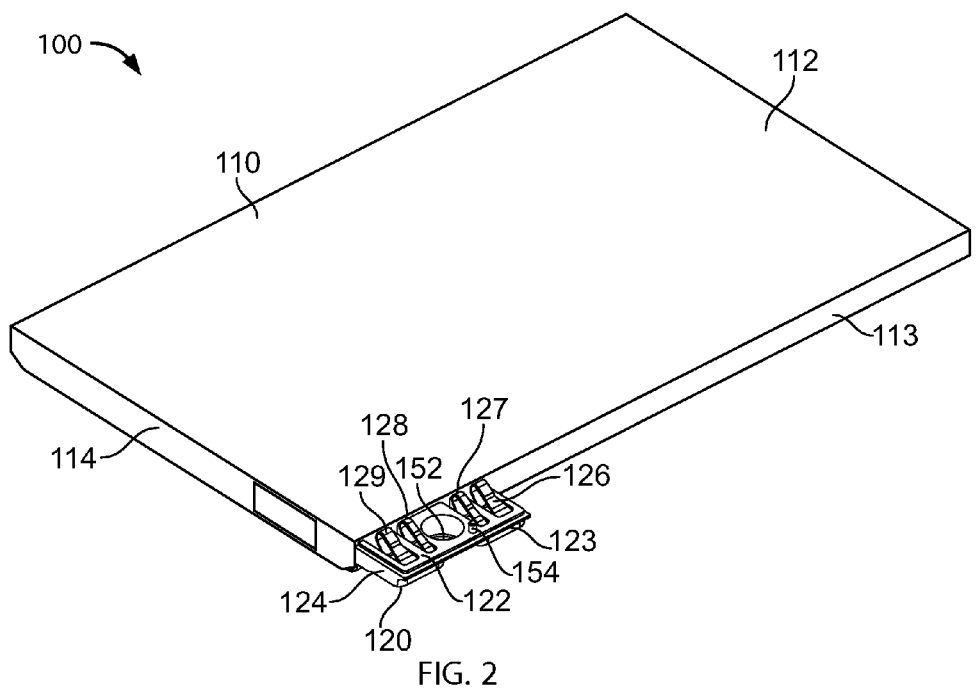
FIG. 2 is a bottom perspective view of the illustrative battery assembly of FIG. 1 in accordance with one embodiment of the invention.

FIG. 1 is a top perspective view of an illustrative battery assembly for an electronic device in accordance with one embodiment of the invention. FIG. 2 is a bottom perspective view of the illustrative battery assembly of FIG. 1 in accordance with one embodiment of the invention. FIG. 3 is an exploded view of the battery assembly of FIG. 1 in accordance with one embodiment of the invention. FIG. 4 is a side view of the battery connector of the battery assembly of FIG. 1 in accordance with one embodiment of the invention. Battery assembly 100 may include battery cell 110 and battery connector 120. Battery cell 110 may include any suitable type of battery, including for example a single use battery or a rechargeable battery. The type of battery used may be selected based on the application of the battery (e.g., the type of electronic device using the battery cell). For example, in a cellular telephone or portable media player, a rechargeable battery may be preferable. As another example, in a digital camera or a remote controller, a single use battery may be preferable.

Battery cell 110 may use any suitable approach for holding a charge. For example, if battery cell 110 is a rechargeable battery, battery cell 110 may include a lead and sulfuric acid, nickel cadmium (NiCd), nickel metal hydride (NiMH), lithium ion (Li-ion), or a lithium ion polymer (Li-ion polymer) cell chemistry. In some embodiments, other cell chemistries may be used to hold the charge for the electronic device. Battery cell 110 may be in any suitable shape. For example, battery cell 110 may be substantially in a box-like shape, with top surface 111, bottom surface 112, elongated sides 113, and shortened sides 114, or any other suitable shape. In some embodiments, the shape of battery cell 110 may be determined by the shape of the electronic device in which the battery cell is placed. For example, if the electronic device includes a housing with a curved wall, battery cell 110 may include a curved surface or a chamfer 116 along one or more edges of battery cell 110.

Battery connector 120 may provide a connection between battery cell 110 and the electronic device to which it is coupled. Battery connector may be located adjacent any suitable portion of battery cell 110, including for example adjacent elongated side wall 113, and between the planes defined by top surface 111 and bottom surface 112. Battery connector 120 may be constructed in any suitable shape, including for example in a substantially box-like shape, with top surface 121, bottom surface 122, elongated sides 123, and shortened sides 124, or any other suitable shape. In some embodiments, battery connector 120 may include a chamfer 126 similar or substantially similar to chamfer 116 of battery cell 110 to ensure that battery assembly 100 fits correctly in the electronic device.

Any suitable approach may be used to electrically couple battery connector 120 to battery cell 110 (i.e., to allow power to flow from battery cell 110 to the electronic device). For example, battery cell 110 may include an electrically conductive portion on elongated side wall 113 that is placed in contact with an electrically conductive portion of battery connector 120 (e.g., along elongated side 123). As another example, battery cell 110 may be coupled to battery connector 120 using one or more wires (not shown). As still another example, battery cell 110 may be electrically coupled to battery connector 120 using flex circuit 130. Because flex circuit 130 may be substantially entirely conductive, while remaining very thin, a large amount of power may pass from battery cell 110 to battery connector 120 using a low-profile structure (e.g., a large amount of bulky wires would be required to couple battery cell 110 to battery connector 120 in a manner equivalent to that of flex circuit 130). In addition, because a separate component is used to couple battery cell 110 to battery connector 120, battery connector 120 may be easily reused with a new battery cell when an original battery cell 110 loses its charge, and easier to place in the electronic device.

Flex circuit 130 may be any suitable size, and constructed in any suitable shape. For example, the size of flex circuit 130 may be determined by the power requirements of the electronic device (e.g., the amount of power that needs to pass from battery cell 110 to battery connector 120 at any moment of time), the conductivity of flex circuit 130, the size of the conductive portions of battery cell 110 and battery connector 120, or any other suitable criteria. In the example shown in FIGS. 1 and 2, the portion 132 of flex circuit 130 coupled to battery connector 120 may be at least as long as elongated side wall 123 (e.g., to maximize the contact of flex circuit 130 with battery connector 120). In addition, the portion 131 of flex circuit 130 coupled to battery cell 110 may be in the shape of a quarter circle, where the radius of the circle is substantially equal to the length of portion 132. In some embodiments, flex circuit 130 may in addition include portion 133 extending past the edge of top surface 111 and coupled to shortened side wall 114 (e.g., to improve or strengthen the structural connection between flex circuit 130 and battery cell 110).

As shown in FIG. 4, battery connector 120 may be flexibly coupled such that battery connector 120 may move relative battery cell 110, for example to facilitate the placement of battery assembly 100 in the electronic device. In particular, battery connector 120 may rotate relative battery cell 110 along axis 135. This may allow battery cell 110 to be independently coupled to the electronic device (e.g., using an adhesive layer, as described below). Battery connector 120 may provide power to the electronic device using any suitable approach. In some embodiments, battery connector 120 may include pads 126, 127, 128 and 129, which may be distributed on any suitable surface of battery connector 120 (e.g., bottom surface 122). Pads 126, 127, 128 and 129 may be used to provide any suitable conductive or sensing mechanism. For example, two of the pads may be used to transfer power (e.g., a power pad and a ground pad), and two of the pads may be coupled to temperature sensing components (e.g., to ensure that battery cell 110 does not overheat).

Pads 126, 127, 128 and 129 may be disposed on battery connector 120 using any suitable approach. For example, different pads my be placed on different sides of battery connector 120 (e.g., power and ground pads on bottom surface 122, temperature sensing pads on top surface 121). In some embodiments, all of the pads may be located on the same surface of battery connector 120 (e.g., on bottom surface 122, as shown in FIG. 2). To reduce errors in the placement of battery connector 120 in the electronic device, the pads may be symmetrically distributed. For example, pads 126 and 129, which may be located on the outer edges of bottom surface 120, may provide power, while pads 127 and 128, which may be located inside of pads 126 and 129, may provide temperature sensing capabilities. The pads may be the same or different, for example based on their use (e.g., power supplying pads 126 and 129 may be wider, larger, or in a different material than temperature sensing pads 127 and 128).

Pads 126, 127, 128 and 129 may be manufactured from any suitable conductive material, including for example a metal, composite material, plasma, or any other suitable material. To ensure that battery connector 120 always maintains a sufficient electrical coupling with the electronic device, a portion of the pads may flexibly extend from battery connector 120 to contact a corresponding portion of the electronic device. For example, the pads may include a cantilever spring (e.g., flat strip 141 coupled to the battery connector at end 142). In some embodiments, the pads may include flattened or rounded contact surface 143 to maximize the portion of each pad that is in contact with the electronic device. In addition, each pad may include return 144 connecting contact surface 143 to battery connector 120 beneath strip 141. Return 144 may provide additional resistance when the electronic device presses against contact surface 143 to ensure that power continues to pass from battery cell 110 to the electronic device, even during shock or impact events that could otherwise cause the pads to be displaced.

Battery connector 120 may include any suitable mechanism for aligning pads 126, 127, 128 and 129 with the electronic device. In some embodiments, battery connector 120 may include aperture 152 for receiving a mechanical connector (e.g., a screw) operative to engage an appropriate feature of the electronic device (e.g., a threaded boss insert). Aperture 152 and the threaded boss (or other feature) of the electronic device may be designed such that when aperture 152 is aligned with the threaded boss, the battery connector pads are aligned with appropriate elements (e.g., conductive portions) of the electronic device. The mechanical connector may then pass through aperture 152 and engage the threaded boss to ensure that battery connector 120 remains substantially immobile, or at least that the pads remain in contact with their counterparts on the electronic device, even during shock or impact events. In some embodiments, at least a portion of the threaded boss insert, or other feature may extend into aperture 152 to provide rough alignment and positioning of battery connector 120.

In some embodiments, battery connector 120 may instead or in addition include post 154. The electronic device may include an indentation located such that when battery connector 120 is properly aligned on the electronic device, post 154 is placed in the indentation. In some embodiments, the indentation may be in a circuit board or other component of the electronic device. Because each of pads 126, 127, 128 and 129 may need to be placed in contact with the proper counterpart element of the electronic device to ensure proper functioning, battery connector 120 may include one or more alignment features. For example, battery connector 120 may include a rough alignment mechanism (e.g., aperture 152), a fine alignment mechanism (e.g., post 154), and a locking screw (e.g., a mechanical fastener passing through aperture 152). In some embodiments, other alignment mechanisms may be used instead or in addition of those described here.

Figure 5:
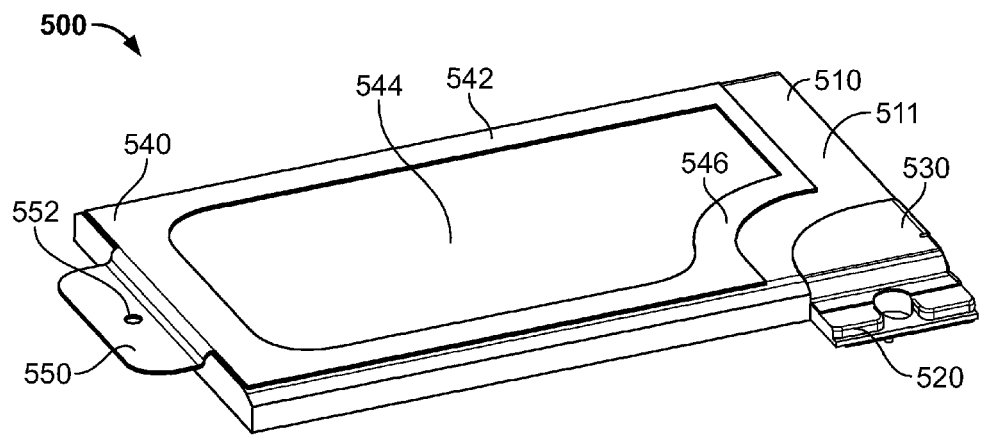
FIG. 5 is a perspective view of an illustrative removable battery assembly in accordance with one embodiment of the invention.
Figure 6:
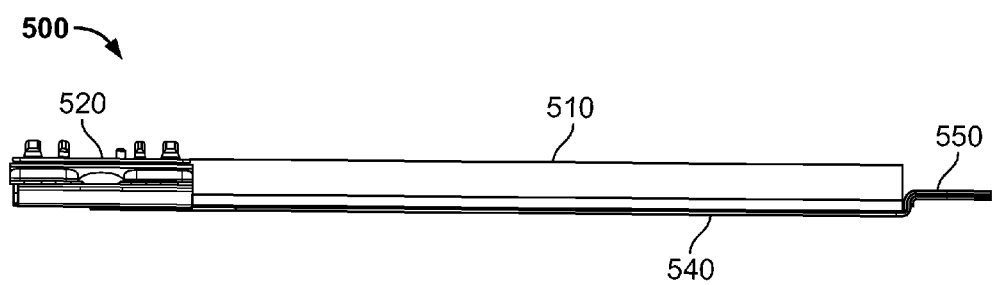
FIG. 6 is a side view of the removable battery assembly of FIG. 5 in accordance with one embodiment of the invention.
Figure 7:
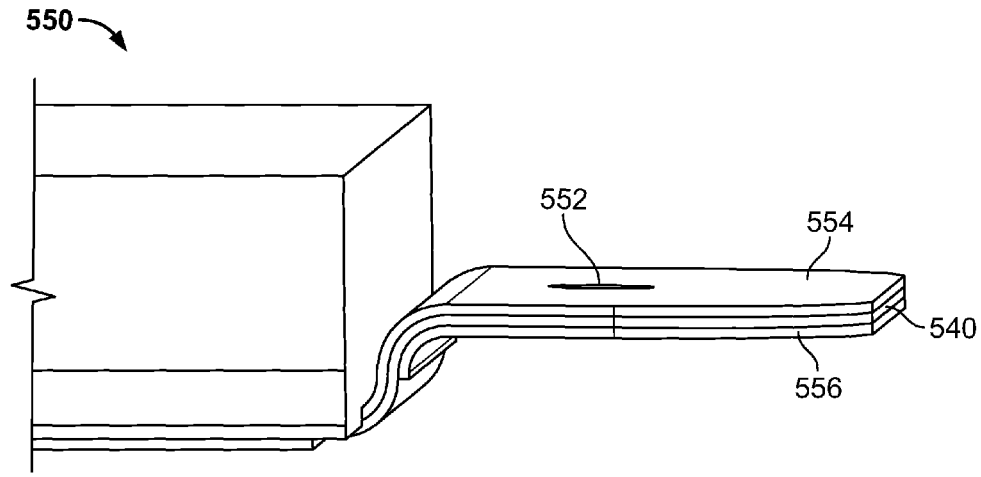
FIG. 7 is a perspective view of a detail of the of the removable battery assembly of FIG. 5 in accordance with one embodiment of the invention.

The battery assembly may be coupled to the electronic device using any suitable approach. In some embodiments, the battery assembly may be fixedly coupled to the electronic device (e.g., by using a strong adhesive or other mechanism that cannot be undone without damaging the electronic device, or by preventing access to the battery assembly). In some embodiments, the battery assembly may instead be detachedly coupled to the electronic device. FIG. 5 is a perspective view of an illustrative removable battery assembly in accordance with one embodiment of the invention. FIG. 6 is a side view of the removable battery assembly of FIG. 5 in accordance with one embodiment of the invention. FIG. 7 is a perspective view of a detail of the of the removable battery assembly of FIG. 5 in accordance with one embodiment of the invention.

Battery assembly 500 may include battery cell 510, battery connector 520, and flex circuit 530, which may include some or all of the features of the battery cell, battery connector, and flex circuit described above in connection with FIGS. 1-4. To couple battery assembly 500 to an electronic device, adhesive layer 540 may be attached to top surface 511 of battery cell 510. Adhesive layer 540 may include any suitable type of adhesive, including for example, an adhesive, a material to which an adhesive is added (e.g., adding an epoxy or other glue to the material of layer 540), a tape (e.g., double sided tape), hook and fastener material (e.g., Velcro), or any other suitable type of adhesive. In some embodiments, adhesive layer 540 may include a double sided tape with a backing layer on at least the side facing the electronic device (e.g., to allow for the manufacturing of battery assembly 500 prior to insertion in the electronic device.

Adhesive layer 540 may be constructed in any suitable shape. For example, adhesive layer 540 may cover most or substantially all of top surface 511 (e.g., to ensure that battery assembly 500 does not move while in use). As another example, adhesive layer 540 may include one or more holes 544 to allow for easier removal and replacement of battery assembly 500. In some embodiments, adhesive layer 540 may at least include periphery portions 542 for holding the edges of battery cell 510. Adhesive layer 540 may include any suitable topography, and may for example include curved portion 546 for passing adjacent flex circuit 530 (e.g., so as not to disturb or affect the electrical coupling between battery cell 510 and battery connector 520). In some embodiments, the total surface of adhesive layer 540 and the strength of the adhesive used may be selected to ensure that battery cell 510 remains coupled to the electronic device while allowing easy removal when necessary (e.g., adhesive layer 540 is only on periphery portions 542).

Battery assembly 500 may include any suitable element or feature for assisting a user in removing battery assembly 500 from the electronic device (e.g., when the battery is defective or too old). In some embodiments, battery assembly 500 may include tab 550 extending beyond the periphery of battery cell 510. To remove battery assembly 500 from the electronic device, a user may pull tab 550 to cause adhesive layer 540 to peal from the electronic device, thus releasing battery assembly 500. In some embodiments, a different adhesive may be used on each side of adhesive layer 540 so that battery assembly 500 and adhesive layer 540 are removed from the electronic device in response to pulling or pealing tab 550 (e.g., the adhesive used between battery cell 510 and adhesive layer 540 is stronger than the adhesive used between adhesive layer 540 and the electronic device).

Tab 550 may be constructed using any suitable approach to ensure that tab 550 does not become detached from battery assembly 500 when the battery assembly is removed. For example, tab 550 may be constructed from a portion of adhesive layer 540 that extends beyond the periphery of top surface 511 of battery cell 510. The upper and lower surfaces of adhesive layer 540 that forms tab 550 may be covered by a non-adhesive backing layers or liners 554 and 556, respectively, to prevent tab 550 from becoming fastened or attached to an element of the electronic device, thus preventing tab 550 from being accessible.

Tab 550 may include any suitable feature for assisting a user in removing battery assembly 500. For example, tab 550 may be large enough for a user to grasp the tab with his fingers. As another example, tab 550 may include a feature (e.g., hole 552) for receiving a tool operative to remove battery assembly 500. Any suitable tool, including for example a tool having a hook for engaging hole 552, may be used to pull tab 550. In some embodiments, a specific tool may be designed for use with tab 550, and may be provided to users or technicians who wish to remove and replace battery assemblies.

Prior to removing battery assembly 500 by separating adhesive layer 540 from the electronic device, the user may first disengage battery connector 520 from the electronic device. For example, a user may first remove a screw or other mechanical fastener connecting battery connector 520 to the electronic device. Once battery connector 520 has been disengaged, the user may peel adhesive layer 540 and displace battery cell 510 with minimal risk of damaging battery connector 520 and flex circuit 530.

When replacing a battery of the electronic device, the user may first open the electronic device (e.g., open a battery bay) to access the battery assembly. Next, the user may remove the old battery assembly by removing the battery connector, and separating the adhesive layer placed between the battery cell and the electronic device from the electronic device (e.g., by pealing the adhesive layer by pulling on a tab extending from the battery cell). The replacement battery assembly may include a battery cell, battery connector, and flex circuit coupling the battery cell to the battery connector. To place the replacement battery assembly in the electronic device, the user may first place the battery connector in the electronic device (e.g., aligning the pads of the battery connector). Once the battery connector is properly coupled and secured, the user may remove a backing layer from an adhesive layer secured to the battery cell (e.g., a backing layer between the adhesive layer and the electronic device) to expose the adhesive of the adhesive layer, and place the battery cell in the electronic device. The newly exposed adhesive layer may adhere to the electronic device, thus finishing securing the battery assembly. The user may then close the electronic device (e.g., close the battery bay) to complete the task.

In some embodiments, battery connector 520 may remain in the electronic device, and only battery cell 510 may be replaced. For example, instead of decoupling battery connector 520 from the electronic device, the user or technician may instead remove flex circuit 530 from one or both of battery cell 510 and battery connector 520. The replacement battery cell 510 may then be inserted in the electronic device, and the original or a new flex circuit 530 may be used to electrically couple the replacement battery cell 510 battery connector 520. Keeping the same battery connector 520 may reduce the cost of replacing a battery, and also reduce the impact of the electronic device on the environment.

The above described embodiments of the present invention are presented for purposes of illustration and not of limitation, and the present invention is limited only by the claims which follow.

What is claimed is:

1. A method for replacing a battery assembly in an electronic device, the battery assembly comprising a battery connector that is a separate structure, wherein a flex circuit is coupled to a top surface of a battery cell and to the battery connector, the method comprising:
   removing a mechanical fastener passing through a hole in the battery connector;
   pulling a tab extending from an adhesive layer placed between the battery cell and the electronic device to release the battery cell;
   removing the battery assembly from the electronic device;
   placing a replacement battery assembly in the electronic device;
   passing the mechanical fastener through the hole in the battery connector of the replacement battery assembly; and
   coupling the mechanical fastener to the electronic device to secure the battery connector.

2. The method of claim 1, further comprising:
   removing a backing layer from an adhesive layer coupled to the battery cell of the replacement battery assembly.

3. The method of claim 2, further comprising:
   attaching the battery cell to the electronic device using the exposed adhesive layer.

4. The method of claim 1, wherein pulling further comprises pulling the tab using a tool.

5. The method of claim 4, wherein pulling further comprises pealing the adhesive layer from the electronic device.

6. The method of claim 1, further comprising opening a battery bay of the electronic device.

7. A method for removing a battery assembly in an electronic device, the battery assembly comprising a battery connector that is a separate structure, wherein a flex circuit is coupled to a top surface of a battery cell and to the battery connector, the method comprising:
   detaching the battery connector from the electronic device;
   detaching an adhesive layer placed between the battery cell and the electronic device from one of the battery cell and the electronic device; and
   removing the battery cell from the electronic device.

8. The method of claim 7, further comprising:
   detaching the battery connector from the battery cell.

9. The method of claim 7, wherein detaching the battery connector further comprises:
   removing a mechanical fastener from a hole extending through the battery connector.

10. The method of claim 7, wherein detaching the battery cell further comprises:
    capturing a tab extending from the adhesive layer, wherein the tab extends beyond a periphery of the battery cell; and
    pulling the tab to peel off the adhesive layer.

11. The method of claim 10, wherein pulling further comprises pulling the tab using a tool.

12. The method of claim 7, further comprising:
    opening a battery bay of the electronic device.

13. A method for connecting a replacement battery assembly to an electronic device, the battery assembly comprising a battery connector that is a separate structure, wherein a flex circuit is coupled to a top surface of a battery cell and to the battery connector, the method comprising:
    placing a replacement battery assembly in the electronic device;
    passing a mechanical fastener through the hole in the battery connector of the replacement battery assembly; and
    coupling the mechanical fastener to the electronic device to secure the battery connector.

14. The method of claim 13, further comprising:
    connecting an adhesive layer coupled to a surface of the battery cell to the electronic device.

15. The method of claim 14, further comprising:
    removing a backing layer from the adhesive layer coupled to a surface of the battery cell.

16. The method of claim 13, further comprising:
    retrieving a battery connector from a replaced battery assembly; and
    connecting the retrieved battery connector to a replacement battery cell to from the replacement battery assembly.

17. The method of claim 16, wherein connecting further comprises:
    establishing an electrically conductive path between the replacement battery connector and the replacement battery cell.

* * * * *